(12) United States Patent
Tang (10) Patent No.: US 10,466,725 B2
(45) Date of Patent: Nov. 5, 2019

(54) DEVICE FOR CONTROLLING WATER HEATER

(71) Applicant: GUANGZHOU SEAGULL KITCHEN AND BATH PRODUCTS CO., LTD, Guangzhou (CN)

(72) Inventor: Taiying Tang, Guangzhou (CN)

(73) Assignee: GUANGZHOU SEAGULL KITCHEN AND BATH PRODUCTS CO., LTD, Guangzhou (CN)

( * ) Notice: Subject to any disclaimer, the term of this patent is extended or adjusted under 35 U.S.C. 154(b) by 281 days.

(21) Appl. No.: 15/508,022

(22) PCT Filed: Apr. 6, 2016

(86) PCT No.: PCT/CN2016/078507
§ 371 (c)(1),
(2) Date: Mar. 1, 2017

(87) PCT Pub. No.: WO2017/161603
PCT Pub. Date: Sep. 28, 2017

(65) Prior Publication Data
US 2018/0188751 A1    Jul. 5, 2018

(30) Foreign Application Priority Data

Mar. 25, 2016  (CN) .......................... 2016 1 0176951
Mar. 25, 2016  (CN) ..................... 2016 2 0238091 U (51) Int. Cl.
G05D 23/19        (2006.01)
F24H 9/20         (2006.01)
(Continued)

(52) U.S. Cl.
CPC ....... *G05D 23/1919* (2013.01); *F24H 9/2007* (2013.01); *G05D 23/1917* (2013.01); *G06F 3/0488* (2013.01); *E03C 1/184* (2013.01)

(58) Field of Classification Search
CPC . F24H 9/2007; F24H 9/2014; G05D 23/1917; G06F 3/0488; F24D 19/1051; F24D 19/1006
See application file for complete search history.

(56) References Cited

U.S. PATENT DOCUMENTS

2005/0268865 A1* 12/2005 Valbh .................... F24H 9/2007
                                                122/14.1
2009/0143879 A1*  6/2009 Amundson ............ G05B 13/02
                                                  700/83
(Continued)

*Primary Examiner* — Jonathan Bradford
(74) *Attorney, Agent, or Firm* — CBM Patent Consulting, LLC (57) ABSTRACT

A device for controlling a water heater comprises a touch interface containing five water temperature modes; a capacitive touch unit including a touch sensing circuit, wherein the capacitive touch unit is configured to the touch interface for sensing user touch; a controller connected to the capacitive touch unit, wherein the controller is configured to switch at once among five water temperature modes according to preset sequence when touch interface senses user touch and sends touch signal; wherein one of five-water temperature modes comprises a water temperature without heating function each of remaining four water temperature modes corresponds to temperature range, and temperature range of two adjacent water temperature modes has certain overlaps.

16 Claims, 8 Drawing Sheets

(51) Int. Cl.
  *G06F 3/0488*    (2013.01)
  *E03C 1/184*     (2006.01)

(56) References Cited

U.S. PATENT DOCUMENTS

| | | | |
|---|---|---|---|
| 2010/0206869 A1* | 8/2010 | Nelson | F24D 11/02 |
| | | | 219/494 |
| 2011/0042470 A1* | 2/2011 | Deivasigamani | G05D 23/1909 |
| | | | 236/51 |
| 2013/0270350 A1* | 10/2013 | Subramanian | G05D 23/1917 |
| | | | 236/20 R |
| 2014/0217188 A1* | 8/2014 | Wen | F24H 9/2007 |
| | | | 236/25 R |
| 2015/0346740 A1* | 12/2015 | Whitehouse | F24H 9/2007 |
| | | | 236/12.1 |
| 2016/0025379 A1* | 1/2016 | Moes | F24H 9/20 |
| | | | 700/300 |

* cited by examiner

5pin ribbon wire

DEVICE FOR CONTROLLING WATER HEATER

TECHNICAL FIELD

The present invention relates to a device for controlling a water heater.

BACKGROUND

A currently popular water heater display panel displays temperature by a LED digital tube on the market. Operation condition of the water heater is indicated by different colors of LED indicator, and water temperature modes are selected with a key switch. However, actual application does not require very precise temperature value. Control circuit is complex by the LED digital tube to display temperature, and cost of the water heater is also increased. Water temperature modes have disadvantages by the key switch way to select control, because operation environment of the water heater is kitchen with relatively humid environment. The key switch is easy to get damp after using in such bad environment for a period of time. As a result, final hot water out of the water heater does comply with set water temperature mode, and the water heater out of control also will continuously heat and lead to constant waste of energy.

DESCRIPTION

First purpose of the present invention is to solve at least above problems and to provide at least the advantages that will be described later.

Second purpose of the present invention is to provide a device for controlling a device for controlling water heater selecting water temperature mode by human body capacitive touch mode to control the water heater for automatic heating.

Third purpose of the present invention is to provide a device for controlling a water heater for preventing scalding by reflow hot water remained on external tap pipe to inside of the water heater before the hot water is immediately produced completely and the cold water is flowed out.

Fourth purpose of the present invention is to provide a device for controlling a water heater capable of providing filtered hot and cold water or unfiltered hot and cold water.

The technical solution provided from the present invention is:

A device for controlling a water heater, comprising:

a touch interface containing five water temperature modes for accepting a user touch, wherein the touch interface is formed on the water heater, and is configured to enable a user to select one water temperature mode;

a capacitive touch unit including a touch sensing circuit provided in the water heater, wherein the capacitive touch unit is configured to correspond to the touch interface for sensing a user touch and sending a touch signal;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, and temperature range of two adjacent water temperature modes has certain overlaps.

Preferably, in the above-described device for controlling a water heater, temperature ranges of the four water temperature modes are in order of 81° C. to 86° C., 85° C. to 90° C., 89° C. to 94° C. and 93° C. to 98° C.; and the preset sequence is sequentially cycled in accordance with the five water temperature modes of 81° C. to 86° C., 85° C. to 90° C., 89° C. to 94° C., 93° C. to 98° C. and the mode without heating function.

Preferably, in the device for controlling a water heater, the user touch is set a preset time, when time of the user touch is not shorter than the preset time, the touch interface sensing the user touch and sending a touch signal; when time of the touch action is shorter than the preset time, the touch interface unable to sense the user touch.

Preferably, in the device for controlling a water heater, the preset time is 500 ms.

Preferably, the device for controlling a water heater also comprises:

a heating pipe provided in inner tank of the water heater and electrically connected to the controller;

a temperature detector disposed outside of inner tank of the water heater to detect water temperature of the inner tank, and electrically connected to the controller;

wherein the controller controls power supplying of the heating pipe in accordance with water temperature detected by the temperature detector and current water temperature mode.

Preferably, the device for controlling a water heater also comprises:

four indicator lights which are arranged at the water heater, are located beside the touch interface containing five water temperature modes for accepting a user touch, and are electrically connected with the controller, wherein each indicator light respectively corresponds to a water temperature mode, when one of water temperature mode is selected, the controller controlling indicator light corresponding to the water temperature mode turning on; when the mode without heating function is selected, the four indicator lights being turned on at the same time.

Preferably, in the device for controlling a water heater, when one of water temperature mode is selected, the indicator light corresponding to the water temperature mode twinkles in heating process; and the indicator light is permanent bright when heating reaches the highest temperature of the water temperature; when the mode without heating function is selected, the four indicator lights being turned on at the same time; wherein the indicator lights are LED indicator light.

Preferably, the device for controlling a water heater also comprises:

a power supply;

a power supply indicator light provided in front of the water heater and electrically connected to the power supply and the controller.

Preferably, the device for controlling a water heater also comprises:

a decorative ring disposed on the water heater, wherein the decorative ring is configured to decorate periphery of the touch interface.

A device for controlling a water heater, comprising:

a touch interface containing five water temperature modes for accepting a user touch, wherein the touch interface is formed on the water heater, and is configured to enable a user to select one water temperature mode;

a capacitive touch unit including a touch sensing circuit provided in the water heater, wherein the capacitive touch unit is configured to correspond to the touch interface for sensing a user touch and sending a touch signal;

a hot water solenoid valve provided on a hot water pipeline of the water heater;

a reflow solenoid valve provided on a reflow pipeline of the water heater, wherein the reflow pipeline is connected with the hot water pipeline, and the reflow solenoid valve is a normally-on direct-acting solenoid valve;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, temperature ranges of the four water temperature modes are in order of 81° C. to 86° C., 85° C. to 90° C., 89° C. to 94° C. and 93° C. to 98° C., and the preset sequence is sequentially cycled in accordance with the five water temperature modes of 81° C. to 86° C., 85° C. to 90° C., 89° C. to 94° C., 93° C. to 98° C. and the mode without heating function;

wherein the controller is also electrically connected to the hot water solenoid valve and the reflow solenoid valve, the controller controls the hot water solenoid valve to supply hot water, and controls the reflow solenoid valve to make hot water of the hot water pipeline reflow to the inner tank of the water heater by the reflow pipeline.

Preferably, the device for controlling a water heater also comprises:

a cold water solenoid valve arranged at a cold water pipeline of the water heater, wherein the cold water pipeline is in parallel with the hot water pipeline, and the cold water solenoid valve is also electrically connected to the controller pipeline, when the cold water solenoid valve is opened to supply cold water, the reflow solenoid valve is closed at the same time to prevent scalding caused by mixing hot water when the cold water is supplied.

Preferably, in the device for controlling a water heater, the cold water solenoid valve and hot water solenoid valve are normally-off direct-acting solenoid valves.

Preferably, in the device for controlling a water heater, reflow time of the reflow solenoid valve is 5 s.

A device for controlling a water heater, comprises:

a touch interface containing five water temperature modes for accepting a user touch, wherein the touch interface is formed on the water heater, and is configured to enable a user to select one water temperature mode;

a capacitive touch unit including a touch sensing circuit provided in the water heater, wherein the capacitive touch unit is configured to correspond to the touch interface for sensing a user touch and sending a touch signal;

a filter water supply pipeline provided with a filter, wherein the inner tank of the water heater is arranged at downstream of the filter; liner of a heater of the water heater arranged at downstream of the filter, a tap water supply pipeline;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, temperature ranges of the four water temperature modes are in order of 81° C. to 86° C., 85° C. to 90° C., 89° C. to 94° C. and 93° C. to 98° C.;

and the preset sequence is sequentially cycled in accordance with the five water temperature modes of 81° C. to 86° C., 85° C. to 90° C., 89° C. to 94° C., 93° C. to 98° C. and the mode without heating function.

Preferably, the device for controlling a water heater also comprises:

a hot water solenoid valve provided on hot water pipeline of the filter water supply pipeline and tap water supply pipeline;

a reflow solenoid valve provided on a reflow pipeline of the filter water supply pipeline and the tap water supply pipeline, wherein the reflow solenoid valve is a normally-on direct-acting solenoid valve;

wherein the controller is also electrically connected to the hot water solenoid valve and the reflow solenoid valve, the controller controls the hot water solenoid valve to supply hot water, and controls the reflow solenoid valve to make hot water of the hot water pipeline reflow to the inner tank of the water heater by the reflow pipeline.

Preferably, the device for controlling a water heater also comprises:

a cold water solenoid valve arranged at a cold water pipeline of the water heater, wherein the cold water pipeline is connected in parallel with the hot water pipeline, the cold water solenoid valve is also electrically connected to the controller. When the cold water solenoid valve is opened to supply cold water, the reflow solenoid valve is closed at the same time, so as to prevent scald caused by mixing hot water out of the cold water.

The advantages of the present invention are as follows.

Using capacitive touch mode to select heating water temperature modes, setting five water temperature modes for selection, having heating water temperature mode memory function after power off; providing reflow solenoid valve to prevent scalding by reflow hot water remained on external tap pipe to inside of the water heater before the hot water is immediately produced completely and the cold water is flowed out, providing four pipeline water, selecting filtered or not filtered cold water and hot water according to need, setting mode without heating function. The water temperature mode is in the mode without heating function when supplying power, because the inner tank of the water heater is not filled with water when using the water heater first time, at this time operation of filing water can be performed by the mode without heating function, when filling with water and then selecting other water temperature mode. In case of no need use of hot water, choosing the mode without heating function to avoid waste of electric energy caused by repeated heating of the heating pipe Other advantages, objects, and features of the invention will be showed in part through following description, and in part will be understood by those skilled in the art from study and practice of the invention.

DETAILED DESCRIPTION

The present invention will now be described in further detail with reference to the accompanying drawings as required:

It is to be understood that terms of "having", "containing" and "including" as used herein do not exclude presence or addition of one or more other elements or combinations thereof.

As shown in FIG. 1-16, The present invention provides a device for controlling a water heater, comprising:

a touch interface containing five water temperature modes for accepting a user touch, wherein the touch interface is formed on the water heater 100, and is configured to enable a user to select one water temperature mode;

a capacitive touch unit including a touch sensing circuit provided in the water heater, wherein the capacitive touch unit is configured to correspond to the touch interface for sensing a user touch and sending a touch signal;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, and temperature range of two adjacent water temperature modes has certain overlaps.

In one of embodiment of the invention, it is preferred that temperature ranges of the four water temperature modes are in order of 81° C. to 86° C., 85° C. to 90° C., 89° C. to 94° C. and 93° C. to 98° C.;

The preset sequence being sequentially cycled in accordance with the five water temperature modes of 81° C. to 86° C., 85° C. to 90° C., 89° C. to 94° C., 93° C. to 98° C. and the mode without heating function. The first water temperature mode is 81° C. to 86° C., the second water temperature mode is 85° C. to 90° C., the third water temperature mode is 89° C. to 94° C., the fourth water temperature mode is 93° C. to 98° C., and the fifth water temperature mode is the mode without heating function. The preset sequence being sequentially cycled in accordance with the first water temperature mode of 81° C. to 86° C., the second water temperature mode of 85° C. to 90° C., the third water temperature mode of 89° C. to 94° C., the fourth water temperature mode of 93° C. to 98° C. and the fifth water temperature mode without heating function, and the water temperature mode is stopped in the fifth water temperature mode without heating function after supplying power.

In one of embodiment of the invention, it is preferred that the user touch is set a preset time, when time of the user touch is not shorter than the preset time, the touch interface sensing the user touch and sending a touch signal; when time of the touch action is shorter than the preset time, the touch interface unable to sense the user touch.

In one of embodiment of the invention, it is preferred that the preset time is 500 ms.

In one of embodiment of the invention, it is preferred that the device for controlling a water heater also comprises:

a heating pipe 114 provided in inner tank 111 of the water heater and electrically connected to the controller;

a temperature detector disposed outside of inner tank of the water heater 111 to detect water temperature of the inner tank 111, and electrically connected to the controller;

wherein the controller controls power supplying of the heating pipe 114 in accordance with water temperature detected by the temperature detector and current water temperature mode.

In one of embodiment of the invention, it is preferred that the device for controlling a water heater also comprises:

four indicator lights which are arranged at the water heater, are located beside the touch pattern position for selecting water temperature stall, and are electrically connected with the controller, wherein each indicator light respectively corresponds to a water temperature mode, when one of water temperature mode is selected, the controller controlling indicator light corresponding to the water temperature mode turning on; when the mode without heating function is selected, the four indicator lights being turned on at the same time.

In one of embodiment of the invention, preferably, when one of water temperature mode is selected, the indicator light corresponding to the water temperature mode twinkles in heating process; and the indicator light is permanent bright when heating reaches the highest temperature of the water temperature; when the mode without heating function is selected, the four indicator lights being turned on at the same time; wherein the indicator lights are LED indicator light.

In one of embodiment of the invention, it is preferred that the device for controlling a water heater also comprises:

a power supply;

a power supply indicator light provided in front of the water heater 100 and electrically connected to the power supply and the controller.

In one of embodiment of the invention, it is preferred that the device for controlling a water heater also comprises:

a decorative ring 106 disposed on the water heater, wherein the decorative ring 106 is configured to decorate periphery of the touch interface.

The present invention also provides a device for controlling a water heater, comprising:

a touch interface containing five water temperature modes for accepting a user touch, wherein the touch interface is formed on the water heater 100, and is configured to enable a user to select one water temperature mode;

a capacitive touch unit including a touch sensing circuit provided in the water heater 100, wherein the capacitive touch unit is configured to correspond to the touch interface for sensing a user touch and sending a touch signal;

a hot water solenoid valve provided on a hot water pipeline of the water heater 100;

a reflow solenoid valve provided on a reflow pipeline of the water heater 100, wherein the reflow pipeline is connected with the hot water pipeline, and the reflow solenoid valve is a normally-on direct-acting solenoid valve;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, temperature ranges of the four water temperature modes are in order of 81° C. to 86° C., 85° C. to 90° C., 89° C. to 94° C. and 93° C. to 98° C., and the preset sequence is sequentially cycled in accordance with the five water temperature modes of 81° C. to 86° C., 85° C. to 90° C., 89° C. to 94° C., 93° C. to 98° C. and the mode without heating function;

wherein the controller is also electrically connected to the hot water solenoid valve and the reflow solenoid valve, the controller controls the hot water solenoid valve to supply hot water, and controls the reflow solenoid valve (normally-on type) to make hot water of the hot water pipeline reflow to the inner tank 111 of the water heater 100 by the reflow pipeline.

In one of embodiment of the invention, it is preferred that the device for controlling a water heater also comprises:

a cold water solenoid valve arranged at a cold water pipeline of the water heater 100, wherein the cold water pipeline is connected in parallel with the hot water pipeline, and the cold water solenoid valve is also electrically connected to the controller, When the cold water solenoid valve is opened to supply cold water, the reflow solenoid valve is closed at the same time, so as to prevent scald caused by mixing hot water out of the cold water.

In one of embodiment of the invention, it is preferred that the cold water solenoid valve and hot water solenoid valve are normally off direct-acting solenoid valves, and the reflow solenoid valve is normally on direct-acting solenoid valve.

In one of embodiment of the invention, it is preferred that reflow time of the reflow solenoid valve is 5 s.

The present invention also provides a device for controlling a water heater, comprising:

a touch interface containing five water temperature modes for accepting a user touch, wherein the touch interface is formed on the water heater 100, and is configured to enable a user to select one water temperature mode;

a capacitive touch unit including a touch sensing circuit provided in the water heater, wherein the capacitive touch unit is configured to correspond to the touch interface for sensing a user touch and sending a touch signal;

a filter water supply pipeline provided with a filter, wherein the inner tank 111 of the water heater 100 is arranged at downstream of the filter;

a tap water supply pipeline;

a controller electrically connected to the capacitive touch unit, wherein the controller is configured to switch at once between the five water temperature modes according to a preset sequence when the touch interface senses a user touch and sends a touch signal;

wherein one of the five water temperature modes comprises a water temperature mode which does not activate heating function, each of the remaining four water temperature modes corresponds to a temperature range, temperature ranges of the four water temperature modes are in order of 81° C. to 86° C., 85° C. to 90° C., 89° C. to 94° C. and 93° C. to 98° C.; and the preset sequence is sequentially cycled in accordance with the five water temperature modes of 81° C. to 86° C., 85° C. to 90° C., 89° C. to 94° C., 93° C. to 98° C. and the mode without heating function.

In one of embodiment of the invention, it is preferred that the device for controlling a water heater also comprises:

a hot water solenoid valve provided on hot water pipeline of the filter water supply pipeline and tap water supply pipeline;

a reflow solenoid valve provided on a reflow pipeline of the filter water supply pipeline and the tap water supply pipeline, wherein the reflow solenoid valve is a normally-on direct-acting solenoid valve;

wherein the controller is also electrically connected to the hot water solenoid valve and the reflow solenoid valve, the controller controls the hot water solenoid valve to supply hot water, and controls the reflow solenoid valve (normally-on type) to make hot water of the hot water pipeline reflow to the inner tank 111 of the water heater 100 by the reflow pipeline.

In one of embodiment of the invention, it is preferred that the device for controlling a water heater also comprises:

a cold water solenoid valve arranged at a cold water pipeline of the water heater 100, wherein the cold water pipeline is connected in parallel with the hot water pipeline, and the cold water solenoid valve is also electrically connected to the controller, When the cold water solenoid valve is opened to supply cold water, the reflow solenoid valve is closed at the same time, so as to prevent scald caused by mixing hot water out of the cold water.

In one of embodiment of the invention, as shown in FIG. 1, FIG. 2, FIG. 3, FIG. 4 and FIG. 5, a device for controlling a water heater comprises a water heater 100, a circuit board 200, a circuit board 300, an inner tank 111, a heating pipe 114.

Figure 1:
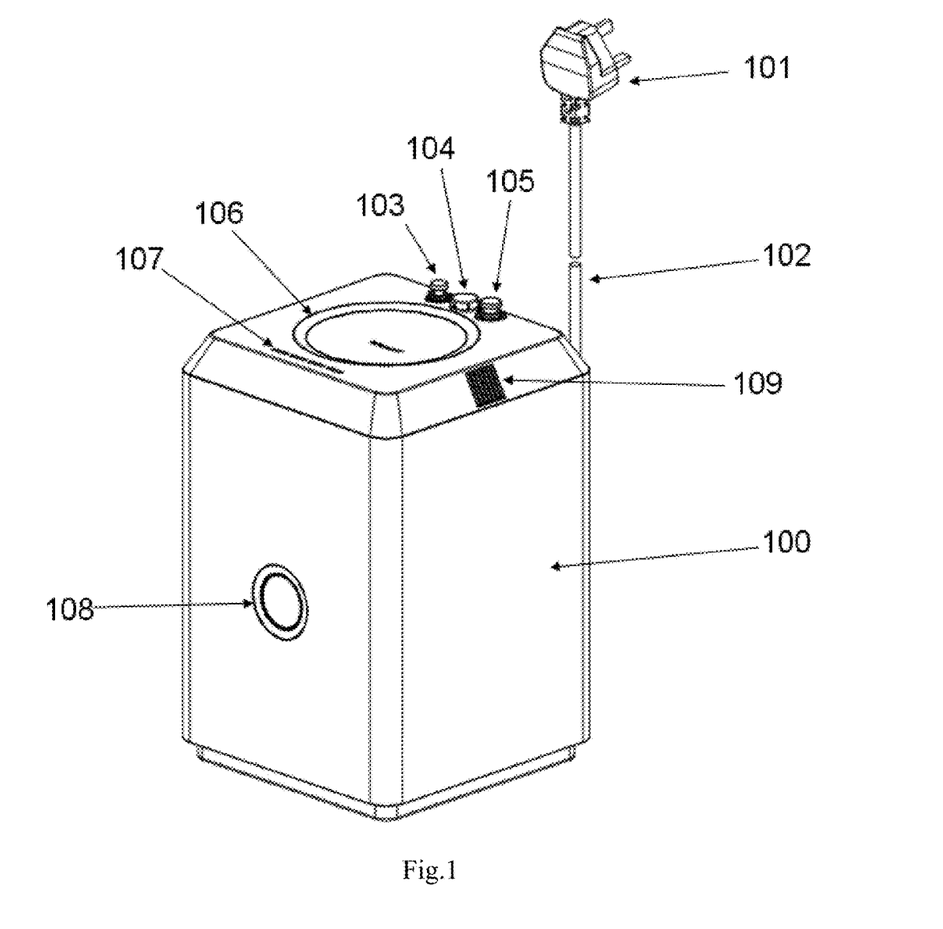
FIG. 1 is a overall view of the water heater of the invention.
Figure 2:
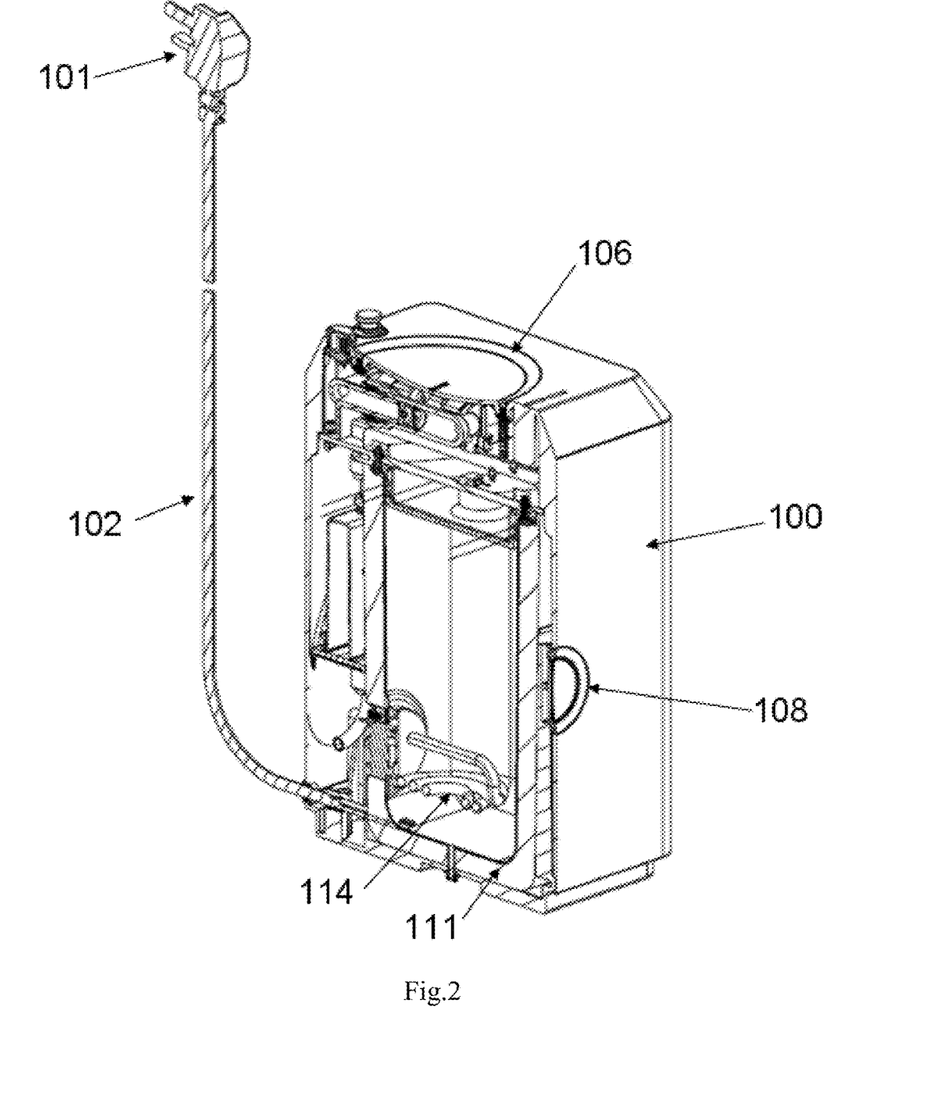
FIG. 2 is a sectional view of the water heater of the invention.
Figure 3:
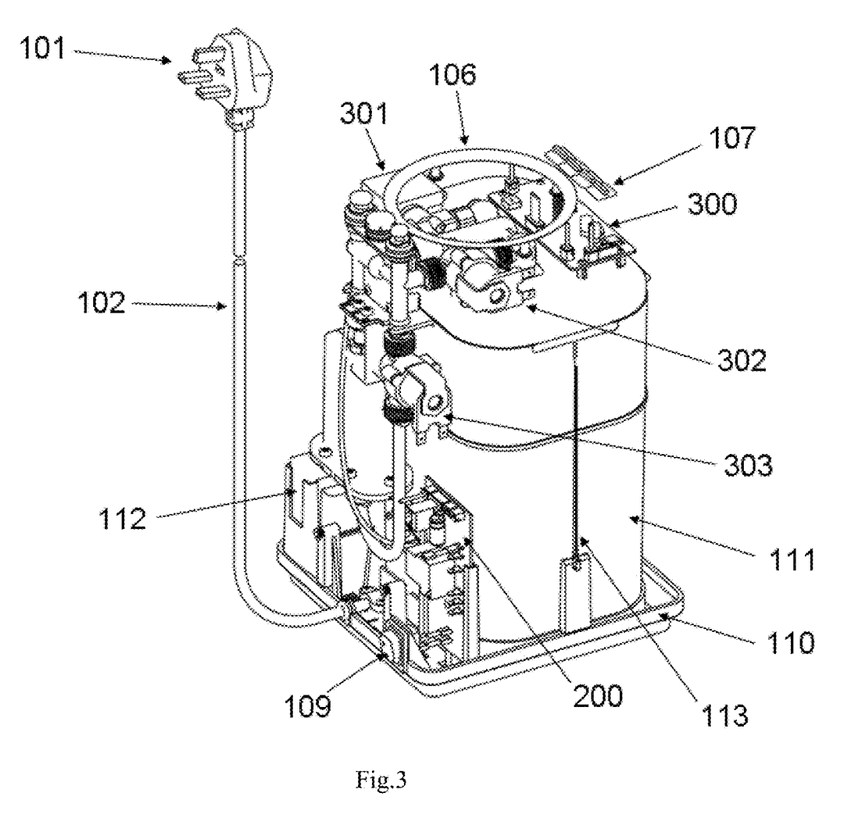
FIG. 3 is a internal structural view of the water heater of the invention.

The water heater 100 comprises a power cord 102 connected to a power plug 101 adapted to corresponding plug according to be sold to different country. Power switch is a power switch of complete machine, and has waterproof soft cover with waterproof function. The water inlet port 103 is a quick-connect port, and the port aperture is 6.3 mm. The water outlet interface port 105 is a quick-connect port, and the port aperture is 9.5 mm. the joint of the control line interface 104 is a 5pin air connector. Top of shell of the water heater 100 is provided with a heat radiating hole 109. The 107 is a water temperature mode indicator light, which is an atomized plastic piece for uniformly transmitting light emitted from stall LED indicator light. The current water temperature mode indicator light is a white LED indicator light (color of the indicator light can be changed as required).

Figure 4:
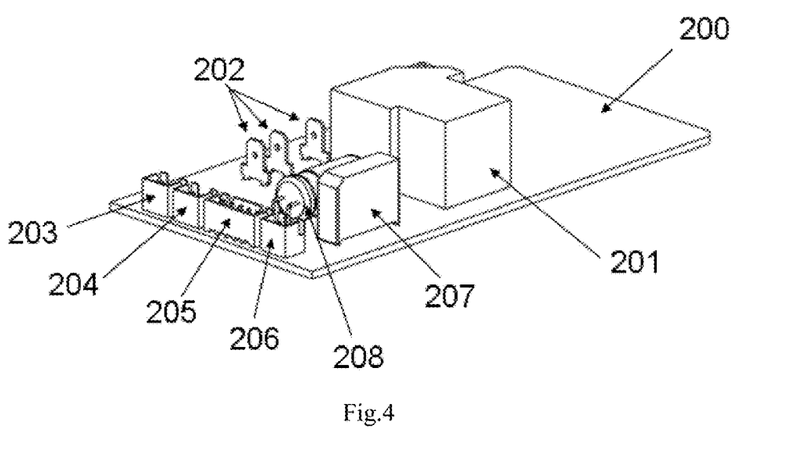
FIG. 4 is A board view of control circuit board of the water heater of the invention.

The circuit board 200 includes a relay 201 which controls power supply of the heating pipe, a rectifier bridge 207 for changing rectifying AC outputted from a transformer 112 into DC24V, a filter capacitor 208, a plug-in piece 202 for connecting the heating pipe, an AC power source and a transformer input terminal; a wiring interface 203 for electrically connecting the power supply indicator light 108 as a power supply indicator for whole machine; a wiring interface 204 for electrically connecting NTC temperature sensor 113; a wiring interface 205 capable of electrically connecting the circuit board 300 using 5 pin cable, and a wiring interface 206 for connecting AC18V power supply outputted from a transformer 112.

Figure 5:
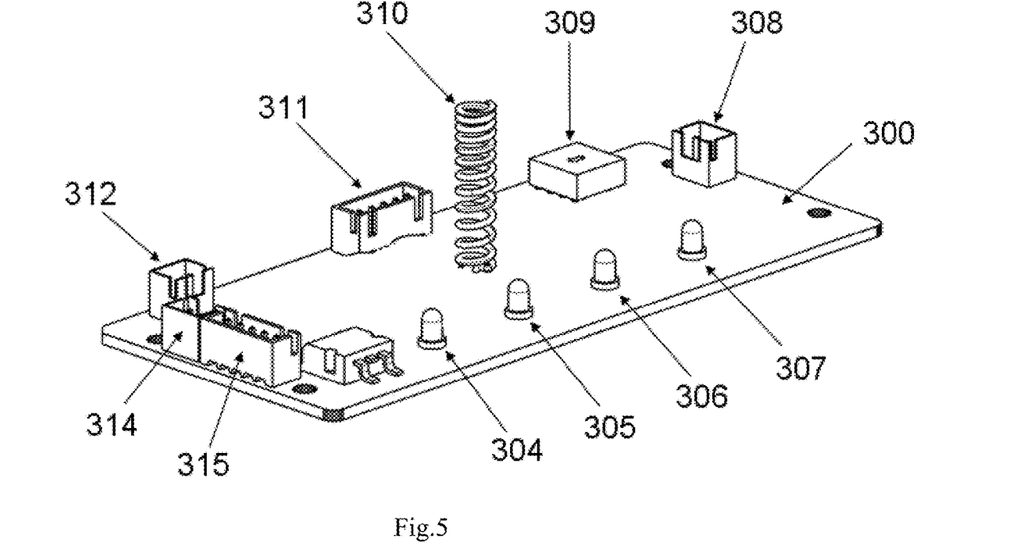
FIG. 5 is B board view of control circuit board of the water heater of the invention.
Figure 6:
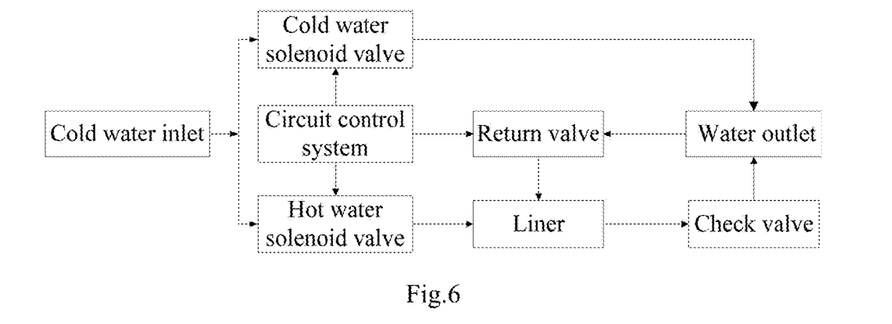
FIG. 6 is a water control block diagram of the water heater of the invention.
Figure 7:
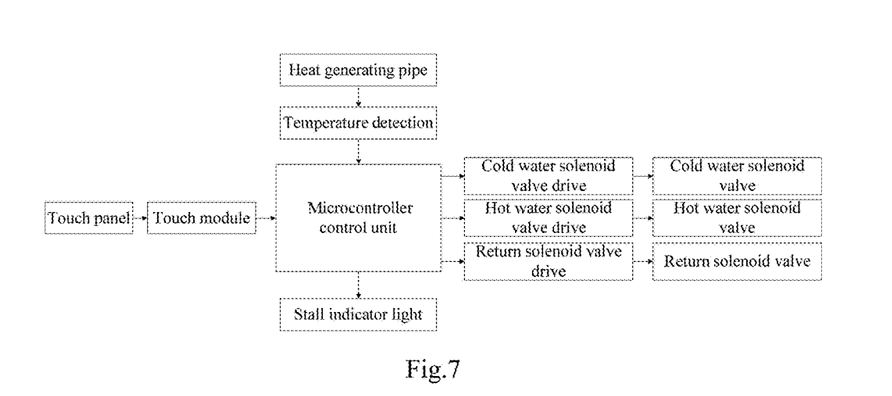
FIG. 7 is a circuit control block diagram of the water heater of the invention.

The circuit board 300 includes four indicator lights comprising a first water temperature mode indicator light 304, a second water temperature mode indicator light 305, a third water temperature mode indicator light 306, a fourth water temperature mode indicator light 307; a wiring interface 308 for electrically connecting the flow solenoid valve 301, a rotary switch 309 for setting delay time, a touch spring 310 for electrically connecting the decorative ring 106, the decorative ring 106 being a plastic piece with an conductive coating on its surface. As a touch input panel, including a wiring interface 311 for electrically connecting a control line interface 104, a connection line interface 312 for electrically connecting the hot water solenoid valve 302, a wiring interface 314 for electrically connecting the cold water solenoid valve 303, a wiring interface 315 for electrically docking the wiring interface 205 of the control board 200.

The inner tank 111 includes a heating pipe 114 with heating power of 2000 W. An NTC temperature sensor 113 is attached to the outer wall of the inner tank for detecting real-time temperature change of water heating by the heating pipe of the inner tank.

Figure 8:
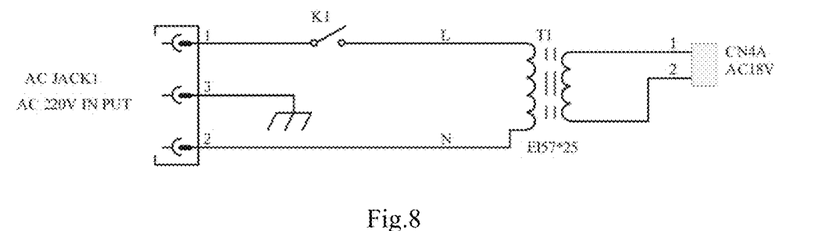
FIG. 8 is a transformer part schematic diagram of the water heater of the invention.

Working Principle of Circuit:

As shown in FIG. 8, AC JACK1 AC is input interface of AC power supply, K1 is a power switch, T1 is a frequency transformer, and CN4A is an output interface of transformer.

Figure 9:
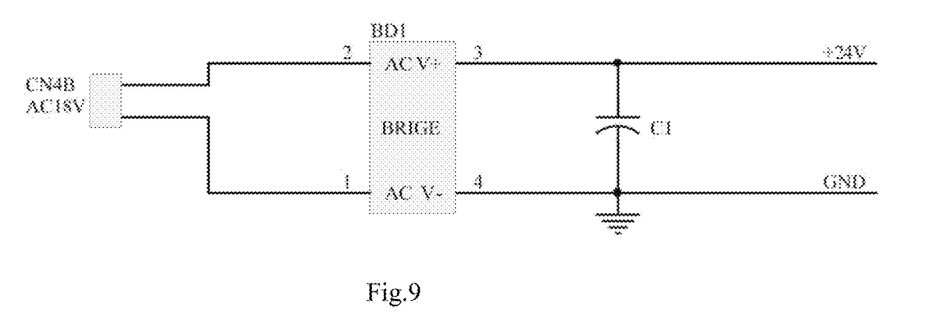
FIG. 9 is a rectifier filter part schematic diagram of the water heater of the invention.

As shown in FIG. 9, CN4B is a power interface for connecting AC18V power supply outputted from transformer, BD1 is a rectifier bridge, and C1 is a filter capacitor.

Figure 10:
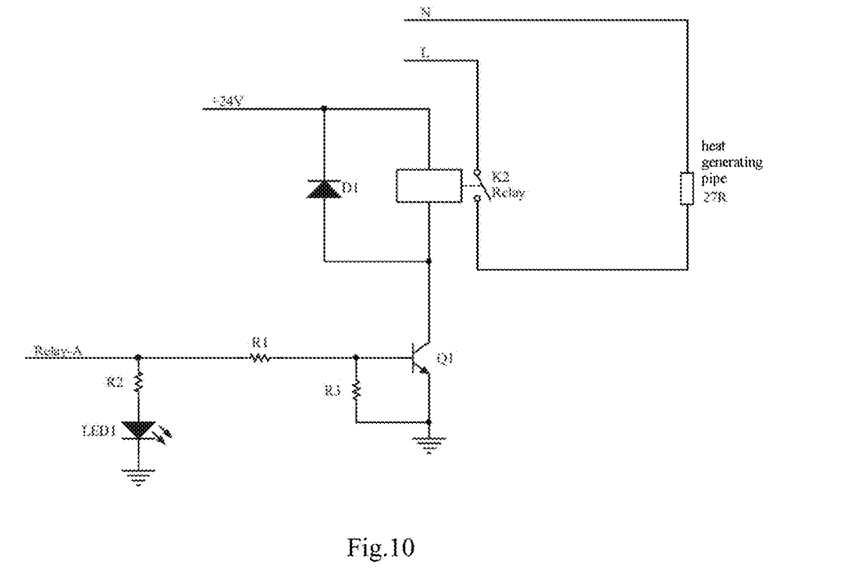
FIG. 10 is a relay drive part schematic diagram of the water heater of the invention.

As shown in FIG. 10, K2 is a relay, Q1 is a relay-driven transistor, LED1 is an indicator light for indicating pull-in action of the relay, D1 is an absorption diode, and the heating pipe is a 2000 W heating pipe.

Figure 11:
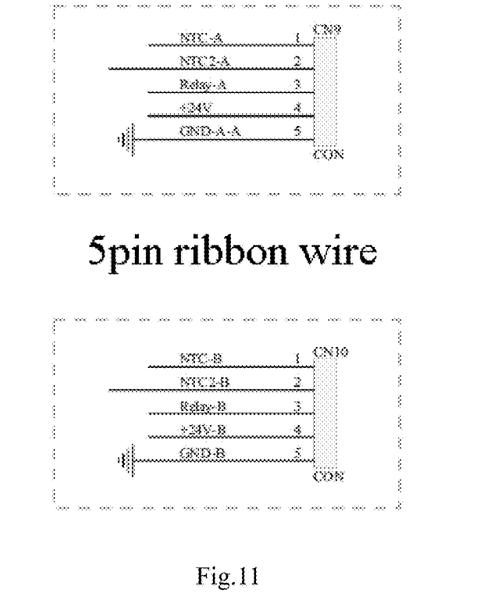
FIG. 11 is a connection schematic diagram of the A board and the B board of the control circuit board of the water heater of the invention.

As shown in FIG. 11, A board and B board are electrically connected by 5pin ribbon wire.

Figure 12:
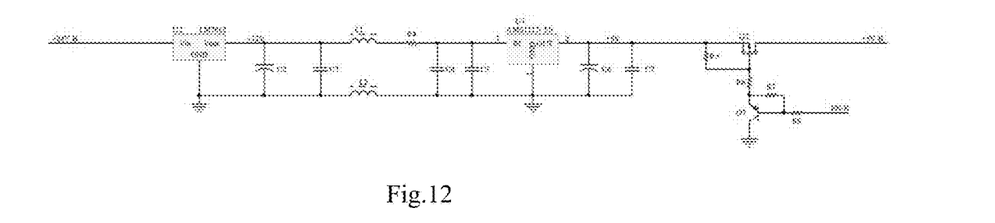
FIG. 12 is a power voltage stabilizing part schematic diagram of the water heater of the invention.

As shown in FIG. 12, U2 is a 12V regulator chip for voltage stabilization of DC24 into 12V, and U2 is 5V regulator chip used to stabilize 12V into 5V to supply power for control chip of whole microcontroller. Q2 and Q3 constitute power supply control circuit of whole machine control system. When EN-B interface is low level, Q2 will be turned on. Then the whole machine control system will have electricity for normal operation. Main purpose of this circuit is only connected with external faucet control circuit when water device control system will have to work to prevent the water device separate electricity work and hot water overflow to cause personnel burns.

Figure 13:
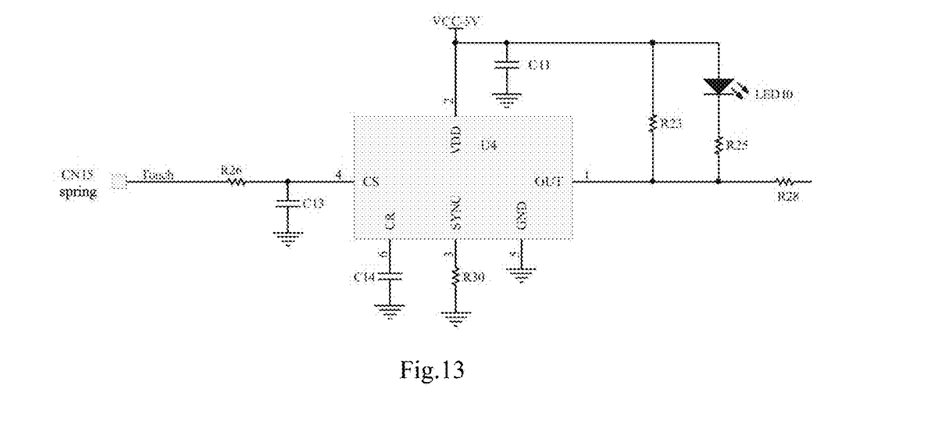
FIG. 13 is a touch control unit part schematic diagram of the water heater of the invention.

As shown in FIG. 13, U4 is a touch chip, CN15 is a spring for connecting a touch panel, and LED10 is a touch signal indicator light. When a touch signal is sent, LED10 will be synchronized lightening.

Figure 14:
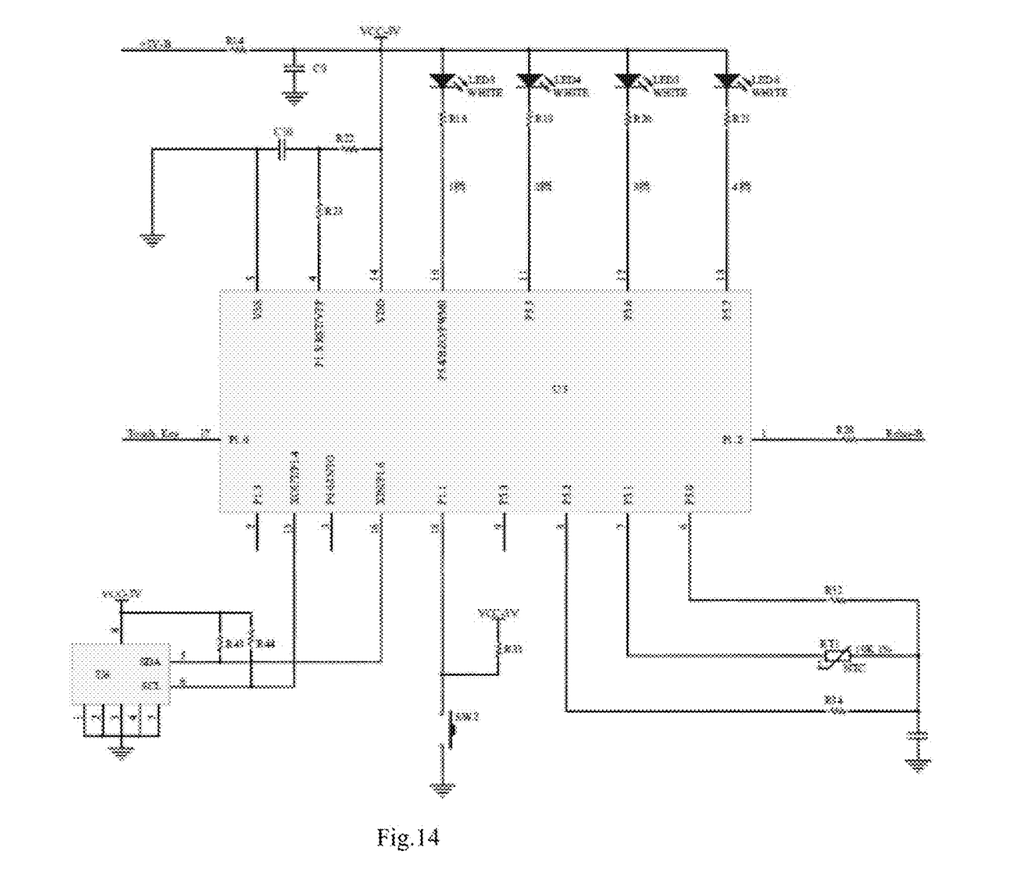
FIG. 14 is a heating control part schematic diagram of microcontroller of the water heater of the invention.

As shown in FIG. 14, U3 is a microcontroller control chip for heating and temperature control of the entire water heater. R22, R23 and C10 constitute a reset circuit of the microcontroller. U6 is a memory chip for memorizing setting water temperature mode before power failure, and automatic jumping set water temperature mode next time power supply. LED3 is a first water temperature mode indicator light. LED4 is a second water temperature mode indicator light. LED5 is a third water temperature mode indicator light. LED6 is a fourth water temperature mode indicator light. RT1 is a NTC thermistor for detecting real time temperature of water temperature of the water heater. SW2 is a manual reset switch, clicking to reset to initial power-up state. 17th Touch Key of single-chip U3 is connected with touch output signal of touch chip (U4 in FIG. 11), the first pin of U3 microcontroller through a resistor R28 connected to base resistor R1 of the relay drive transistor (Q3 in FIG. 8).

Figure 15:
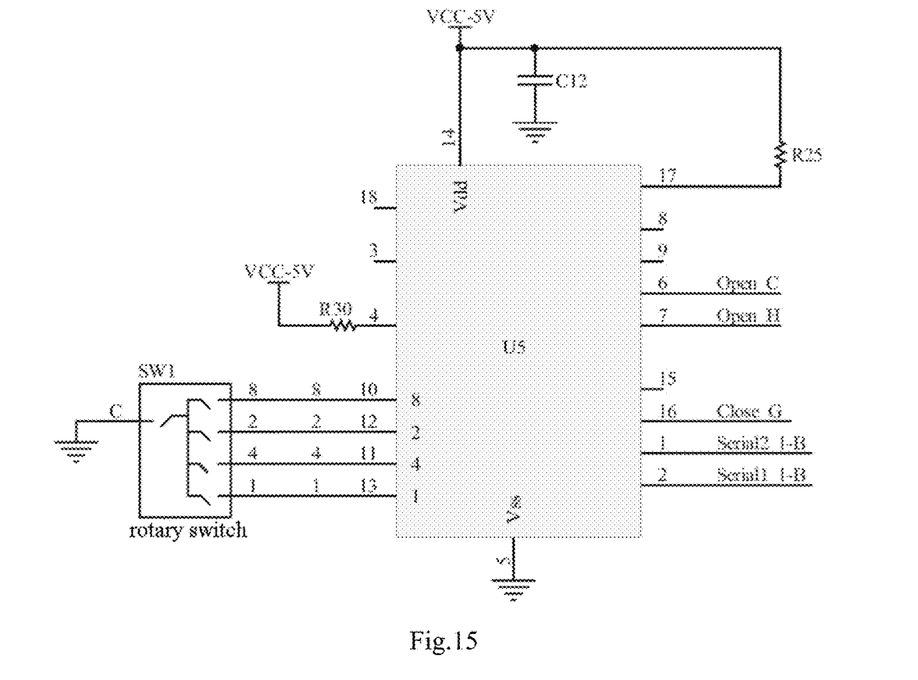
FIG. 15 is a control part schematic diagram of microcontroller of the water heater of the invention.

As shown in FIG. 15, U5 is a primary microcontroller. SW1 is a rotary switch used to set delay time of the cold water solenoid valve. Open C is connected to the cold water solenoid valve drive, Open H is connected to the hot water solenoid valve drive, Close G is connected to the reflow solenoid valve drive. Serial1 and Serial2 is connected to external tap control panel for communication control.

Figure 16:
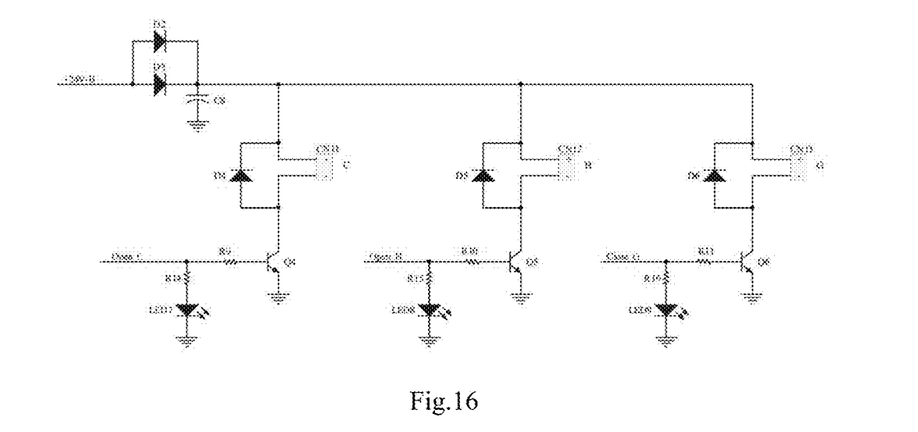
FIG. 16 is a solenoid valve drive part schematic diagram of the water heater of the invention.

As shown in FIGS. 16, D2 and D3 are power supply isolation diodes. C8 is a filter capacitor. Q4 is a cold water solenoid valve drive transistor. LED7 is an action indicator light of the cold water solenoid valve, D4 is a solenoid valve absorption diode. D5 is a hot water solenoid valve drive transistor. D6 is a reflow solenoid valve drive transistor. CN11 is connected with the cold water solenoid valve. CN12 is connected with the hot water solenoid valve. CN13 is connected with the reflow solenoid valve.

Number of modules and scale of processing described herein are intended to simplify description of the invention. The application, modification and variation of touch sensing circuit and temperature water temperature mode of the present invention will be apparent to those skilled in the art.

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A device for controlling a water heater, comprising:
   a touch interface containing five water temperature modes for accepting a user touch, wherein the touch interface is formed on the water heater, and is configured to enable a user to select one water temperature mode;
   a capacitive touch unit including a touch sensing circuit provided in the water heater, wherein the capacitive touch unit is configured to correspond to the touch interface for sensing a user touch and sending a touch signal;
   a controller electrically connected to the capacitive touch unit, wherein the controller is configured to cycle through each of the five water temperature modes based on a preset sequence in response to receiving a touch signal from the capacitive touch unit;
   wherein one of the five water temperature modes comprises an operation mode wherein water is circulated but no heating is performed, each of the remaining four water temperature modes corresponds to a temperature range, wherein each temperature range overlaps with at least one other range of the water temperature modes.

2. The device according to claim 1, being characterized in that: temperature ranges of the four water temperature modes are in order of 81° C. to 86° C., 85° C. to 90° C., 89° C. to 94° C. and 93° C. to 98° C.; and the preset sequence is sequentially cycled in accordance with the five water temperature modes of 81° C. to 86° C., 85° C. to 90° C., 89° C. to 94° C., 93° C. to 98° C. and the non-heating functional water temperature mode.

3. The device according to claim 1, wherein: when a time of the user touch is not shorter than a preset time the touch interface senses the user touch and sends a touch signal; and when the user touch is shorter than the preset time the touch interface does not send the touch signal.

4. The device according to claim 3, being characterized in that: the preset time is 500 ms.

5. The device according to claim 1, being characterized in that: the device further comprises:
 a heating pipe provided in an inner tank of the water heater and electrically connected to the controller;
 a temperature detector disposed outside of the inner tank of the water heater to detect water temperature of the inner tank, and electrically connected to the controller;
 wherein the controller controls power supplying of the heating pipe in accordance with water temperature detected by the temperature detector and a current water temperature mode.

6. The device according to claim 1, being characterized in that: the device further comprises:
 four indicator lights which are arranged at the water heater, are located beside the touch interface containing five water temperature modes for accepting a user touch, and are electrically connected with the controller, wherein each indicator light respectively corresponds to a water temperature mode, when a water temperature mode is selected, the controller controls the indicator light corresponding to the water temperature mode to turn on; when the mode without heating function is selected, the four indicator lights are turned on at the same time.

7. The device according to claim 6, being characterized in that: when a water temperature mode is selected, the indicator light corresponding to the selected water temperature mode is flashed on and off in a heating process; and the indicator light is on when heating reaches a highest temperature of a water temperature mode; when the mode without heating function is selected, the four indicator lights are turned on at the same time; wherein the indicator lights are LED indicator lights.

8. The device according to claim 1, being characterized in that: the device further comprises:
 a power supply;
 a power supply indicator light provided in front of the water heater and electrically connected to the power supply and the controller.

9. The device according to claim 6, being characterized in that: the device further comprises:
 a decorative ring disposed on the water heater, wherein the decorative ring is configured to decorate a periphery of the touch interface.

10. A device for controlling a water heater, comprising:
 a touch interface containing five water temperature modes for accepting a user touch, wherein the touch interface is formed on the water heater, and is configured to enable a user to select one water temperature mode;
 a capacitive touch unit including a touch sensing circuit provided in the water heater, wherein the capacitive touch unit is configured to correspond to the touch interface for sensing a user touch and sending a touch signal;
 a hot water solenoid valve provided on a hot water pipeline of the water heater;
 a reflow solenoid valve provided on a reflow pipeline of the water heater, wherein the reflow pipeline is connected with the hot water pipeline, and the reflow solenoid valve is a normally-on direct-acting solenoid valve;
 a controller electrically connected to the capacitive touch unit, wherein the controller is configured to cycle through each of the five water temperature modes according to a preset sequence when the touch interface senses a user touch and sends a touch signal;
 wherein one of the five water temperature modes comprises an operation mode wherein water is circulated but no heating is performed, each of the remaining four water temperature modes corresponds to a temperature range, temperature ranges of the four water temperature modes are in order of 81° C. to 86° C., 85° C. to 90° C., 89° C. to 94° C. and 93° C. to 98° C., and the preset sequence is sequentially cycled in accordance with the five water temperature modes of 81° C. to 86° C., 85° C. to 90° C., 89° C. to 94° C., 93° C. to 98° C. and the non-heating functional water temperature mode;
 wherein the controller is also electrically connected to the hot water solenoid valve and the reflow solenoid valve, the controller controls the hot water solenoid valve to supply hot water, and controls the reflow solenoid valve to make hot water of the hot water pipeline reflow to the inner tank of the water heater by the reflow pipeline.

11. The device according to claim 10, being characterized in that: the device further comprises:
 a cold water solenoid valve arranged at a cold water pipeline of the water heater, wherein the cold water pipeline is connected in parallel with the hot water pipeline, and the cold water solenoid valve is also electrically connected to the controller.

12. The device according to claim 11, being characterized in that: the cold water solenoid valve and hot water solenoid valve are normally-off direct-acting solenoid valves.

13. The device according to claim 11, wherein a back-flow operation time of the reflow solenoid valve necessary to prevent scalding is at least 5 seconds.

14. A device for controlling a water heater, comprising:
 a touch interface containing five water temperature modes for accepting a user touch, wherein the touch interface is formed on the water heater, and is configured to enable a user to select one water temperature mode;
 a capacitive touch unit including a touch sensing circuit provided in the water heater, wherein the capacitive touch unit is configured to correspond to the touch interface for sensing a user touch and sending a touch signal;
 a filter water supply pipeline provided with a filter, wherein an inner tank of the water heater is arranged downstream of the filter;
 a tap water supply pipeline;
 a controller electrically connected to the capacitive touch unit, wherein the controller is configured to cycle through each of the five water temperature modes according to a preset sequence when the touch interface senses a user touch and sends a touch signal;
 wherein one of the five water temperature modes comprises an operation mode wherein water is circulated but no heating is performed, each of the remaining four water temperature modes corresponds to a temperature range, temperature ranges of the four water temperature modes are in order of 81° C. to 86° C., 85° C. to 90° C., 89° C. to 94° C. and 93° C. to 98° C.; and the preset sequence is sequentially cycled in accordance with the five water temperature modes of 81° C. to 86° C., 85° C. to 90° C., 89° C. to 94° C., 93° C. to 98° C. and the non-heating functional water temperature mode.

15. The device according to claim 14, being characterized in that: the device further comprises:
- a hot water solenoid valve provided on a hot water pipeline of the filter water supply pipeline and the tap water supply pipeline;
- a reflow solenoid valve provided on a reflow pipeline of the filter water supply pipeline and the tap water supply pipeline, wherein the reflow solenoid valve is a normally-on direct-acting solenoid valve;
- wherein the controller is also electrically connected to the hot water solenoid valve and the reflow solenoid valve, the controller controls the hot water solenoid valve to supply hot water, and controls the reflow solenoid valve to make hot water of the hot water pipeline reflow to the inner tank of the water heater by the reflow pipeline.

16. The device according to claim 15, being characterized in that: the device further comprises:
- a cold water solenoid valve arranged at a cold water pipeline of the water heater, wherein the cold water pipeline is connected in parallel with the hot water pipeline, the cold water solenoid valve is also electrically connected to the controller, and the reflow solenoid valve is closed when cold water is supplied by the cold water solenoid valve.

\* \* \* \* \*